(12) United States Patent
Liu

(10) Patent No.: US 8,858,017 B2
(45) Date of Patent: Oct. 14, 2014

(54) MULTIPOLAR CELL POWER SUPPLY DEVICE AND FLASHLIGHT USING THE SAME

(75) Inventor: Yun-Zhao Liu, Guangdong Province (CN)

(73) Assignee: Guangdong Jetfast Portable Lighting Co., Ltd., Guangdong (CN)

( * ) Notice: Subject to any disclaimer, the term of this patent is extended or adjusted under 35 U.S.C. 154(b) by 0 days.

(21) Appl. No.: 13/997,564

(22) PCT Filed: Dec. 28, 2010

(86) PCT No.: PCT/CN2010/080397
§ 371 (c)(1),
(2), (4) Date: Jun. 24, 2013

(87) PCT Pub. No.: WO2012/088664
PCT Pub. Date: Jul. 5, 2012

(65) Prior Publication Data
US 2013/0271967 A1  Oct. 17, 2013

(51) Int. Cl.
*F21L 4/00* (2006.01)
*H01M 10/42* (2006.01)
*H01M 2/30* (2006.01)
*H01M 2/02* (2006.01)
*H01M 2/10* (2006.01)

(52) U.S. Cl.
CPC .............. *F21L 4/00* (2013.01); *H01M 10/425* (2013.01); *Y02E 60/12* (2013.01); *H01M 2/30* (2013.01); *F21L 4/005* (2013.01); *H01M 2/0227* (2013.01); *H01M 2/1055* (2013.01)
USPC ................................ 362/186; 429/7; 362/208

(58) Field of Classification Search
CPC .............................. H01M 10/425; F21L 4/00
USPC ........................................ 362/186, 208; 429/7
See application file for complete search history.

(56) References Cited

U.S. PATENT DOCUMENTS

2002/0001745 A1 *   1/2002   Gartstein et al. ................ 429/61

* cited by examiner

*Primary Examiner* — David V Bruce
(74) *Attorney, Agent, or Firm* — Rosenberg, Klein & Lee

(57) ABSTRACT

A multipolar cell power supply device and a flashlight using the same are provided. The multipolar cell power supply device includes a shell, an electric core inside the hollow part of the shell, a positive pole power distribution unit and a negative pole power distribution unit arranged on the two ends of the shell and respectively corresponding to the positive pole and the negative pole of the electric core, a conductive sheet group for electrically connecting the positive pole power distribution unit to the negative pole power distribution unit, and a controller which is on the end of the shell and electrically connected with the positive pole power distribution unit. The flashlight includes a tube body, the multipolar cell power supply device, a tube head provided with an illuminant and an back end cover provided with a soft cap cover which is corresponding to a signal switch of the controller.

8 Claims, 6 Drawing Sheets

MULTIPOLAR CELL POWER SUPPLY DEVICE AND FLASHLIGHT USING THE SAME

FIELD OF THE INVENTION

The present invention relates to a multipolar cell power supply device and a flashlight using the same, especially to a multipolar cell power supply device and a flashlight using the same that simplify the structure of the flashlight for improving the production efficiency of the flashlight and improve the use life of the flashlight by making a controller away from a light source of the flashlight to prevent damages of the controller caused by high temperature of the light source.

DESCRIPTION OF RELATED ART

The batteries available now are mainly formed by a shell and an electric core. One end of the battery is a positive pole while the other is a negative pole. However, while the battery with such design being applied to a flashlight, a tube body of the flashlight is used as a conductive electrode or a conductive sheet used as an electrode is added to the tube body of the flashlight. Moreover, a control circuit is disposed on the flashlight for controlling power supply of the battery.

The above design including the use of the tube body or the conductive sheet as the electrode and the control circuit arranged at the flashlight increases the manufacturing cost of the flashlight and causes inconvenience in assembling the flashlight. Thus the production efficiency of the flashlight is reduced. Moreover, the control circuit of the flashlight available now is disposed on the front end of the flashlight. A light emitting body is also arranged at the front end of the flashlight. When the light emitting body works, it generates high temperature heat. The high temperature heat has impact on and causes damages to the performance of the control circuit. Thus the service life of the flashlight is dramatically reduced.

In order to overcome the disadvantages of the battery and the flashlight available now such as high manufacturing cost, low production efficiency and reduced service life, there is room for improvement and a need to provide a novel battery and a flashlight using the same.

SUMMARY OF THE INVENTION

Therefore it is a primary object of the present invention to provide a multipolar cell power supply device and a flashlight using the same. The multipolar cell power supply device applied to flashlights controls on/off of the flashlight and regulates functions by program control.

It is another object of the present invention a flashlight using a multipolar cell power supply device with higher production efficiency by not using a tube body of the flashlight or a conductive sheet as an electrode.

It is a further object of the present invention a flashlight using a multipolar cell power supply device that prevents damages to a controller caused by high temperature generated during operation of an illuminant and further increases service life of the flashlight.

In order to achieve the above objects, a multipolar cell power supply device of the present invention includes an electric core disposed inside a shell, a positive pole power distribution unit and a negative pole power distribution unit arranged on the two ends of the shell and respectively corresponding to a positive pole and a negative pole of the electric core. The positive pole power distribution unit and the negative pole power distribution unit are electrically connected by a conductive sheet group. A controller is electrically connected to the shell assembled with the positive pole power distribution unit.

While assembling the multipolar cell power supply device of the present invention inside a space of the tube body of the flashlight, a signal switch of the controller of the multipolar cell power supply device is corresponding to a soft cap cover of the back end cover on the rear end of the flashlight and is away from an illuminant disposed on a front end of the flashlight.

Thereby the power is on or off under the control of the multipolar cell power supply device. There is no need to use the tube body or the conductive sheet as the electrode. The flashlight is arranged with control circuit for controlling the on/off of the battery. Thus the manufacturing cost of the flashlight is significantly reduced. Moreover, the assembly of the flashlight is more convenient and simpler so that the production efficiency of the flashlight is dramatically increased.

Furthermore, the controller of the multipolar cell power supply device is arranged at the rear end of the flashlight and is away from the illuminant disposed on the front end of the flashlight. Thus the high temperature heat generated by the illuminant in use will not cause damages to a circuit of the controller. Therefore the service life of thee flashlight is increased.

Figure 1:
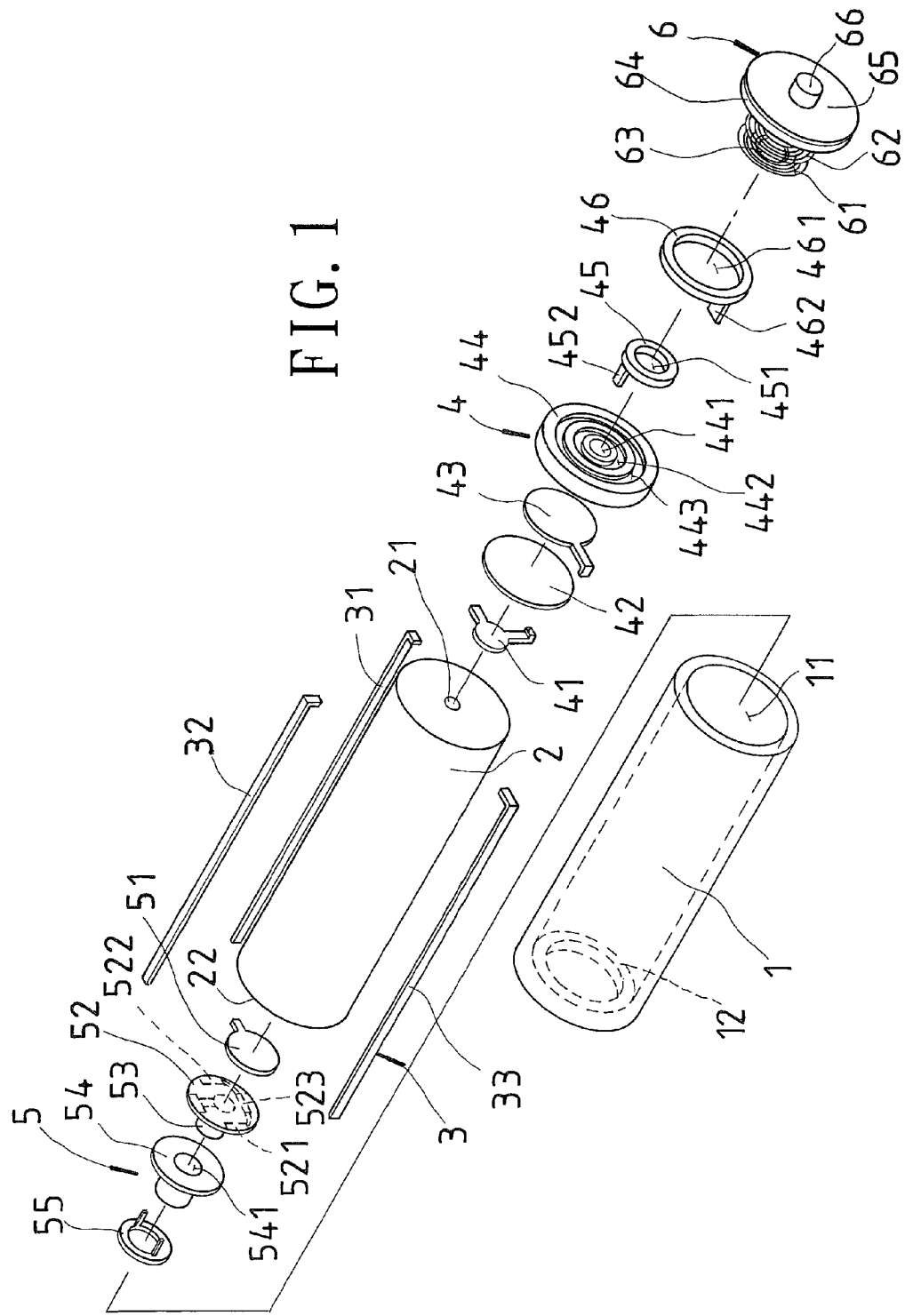
FIG. 1 is an explosive view of an embodiment according to the present invention.

| The reference numerals | |
|---|---|
| 1 shell | 11 hollow part |
| 12 stopper flange | 2 electric core |
| 21 positive pole | 22 negative pole |
| 3 conductive sheet group | 31 positive pole conductive sheet |
| 32 conductive sheet | 33 negative pole conductive sheet |
| 4 positive pole power distribution unit | 41 positive pole pad |
| 42 positive pole plastic base | 43 inner negative plate |
| 44 positive pole base | 441 through hole |
| 442 inner circular groove | 443 outer circular groove |
| 45 middle negative plate | 451 through hole |
| 452 pin | 46 outer positive plate |
| 461 through hole | 462 pin |
| 5 negative pole power distribution unit | 51 negative pole pad |
| 52 negative protection board | 521 negative pole output end |
| 522 negative pole input end 522 | 523 protection circuit |
| 53 positive pole contact | 54 front base |
| 541 central hole | 55 front negative plate |

-continued

The reference numerals

| | | | |
|---|---|---|---|
| 6 | controller | 61 | outer positive spring |
| 62 | middle negative spring | 63 | inner negative spring |
| 64 | seat | 641 | outer thread segment |
| 65 | circuit board | 66 | signal switch |
| 7 | flashlight | 71 | tube body |
| 711 | space | 72 | tube head |
| 73 | light condenser | 74 | transparent sheet |
| 75 | front cover | 76 | illuminant |
| 77 | conductive base | 771 | positive spring |
| 772 | negative spring | 78 | back end cover |
| 781 | hollow-out part | 782 | inner thread segment |
| 79 | cap cover | | |

DETAILED DESCRIPTION OF THE PREFERRED EMBODIMENT

Refer to FIG. 1, a multipolar cell power supply device and a flashlight using the same of the present invention are revealed. The multipolar cell power supply device includes a shell 1, an electric core 2, a conductive sheet group 3, a positive pole power distribution unit 4, a negative pole power distribution unit 5 and a controller 6.

The shell 1 is a cylinder with a hollow part 11 and a stopper flange 12 formed on an inner wall of the hollow part 11 at an end part of the shell 1.

The electric core 2 is mounted in the hollow part 11 of the shell 1. A positive pole 21 and a negative pole 22 are respectively disposed on two ends of the electric core 2. The electric core 2 can be a primary battery such as a carbon zinc battery or a secondary battery such as a rechargeable lithium ion battery.

The conductive sheet group 3 is arranged in the hollow part 11 of the shell 1 and located around the electric core 2. The conductive sheet group 3 includes a positive pole conductive sheet 31, a conductive sheet 32 and a negative pole conductive sheet 33. One end of the positive pole conductive sheet 31 is electrically connected to a positive pole pad 41 of the positive pole power distribution unit 4 while the other end of the positive pole conductive sheet 31 is electrically connected to a positive pole contact 53 of the negative pole power distribution unit 5. One end of the conductive sheet 32 is electrically connected to a middle negative plate 45 of the positive pole power distribution unit 4 while the other end of the conductive sheet 32 is electrically connected to a front negative plate 55 of the negative pole power distribution unit 5. One end of the negative pole conductive sheet 33 is electrically connected to an inner negative plate 43 of the positive pole power distribution unit 4 while the other end of the negative pole conductive sheet 33 is electrically connected to a negative pole output end 521 of a negative protection board 52 of the negative pole power distribution unit 5.

Figure 2:
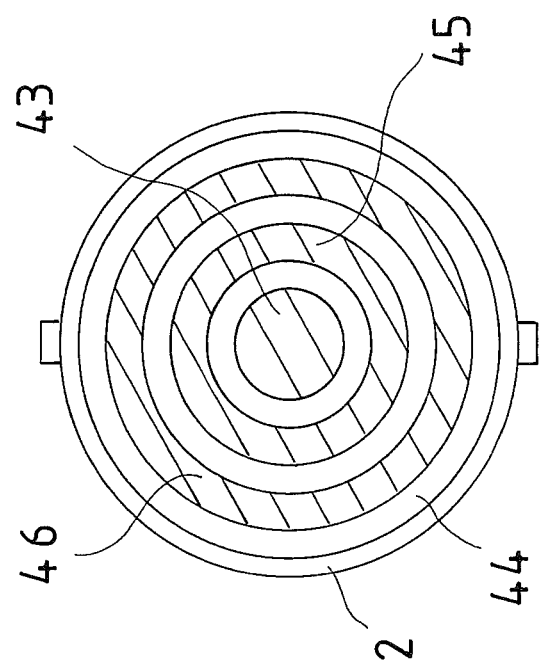
FIG. 2 is a horizontal cross sectional view of a positive pole power distribution unit of an embodiment according to the present invention.

As shown in FIG. 2, a positive pole power distribution unit 4 is disposed on the positive pole 21 of the electric core 2. From the positive pole 21 of the electric core 2 to the outer side, the positive pole power distribution unit 4 includes a positive pole pad 41, a positive pole plastic base 42, an inner negative plate 43, a positive pole base 44, a middle negative plate 45, and an outer positive plate 46 in turn. The positive pole pad 41 is attached to the positive pole 21 of the electric core 2 and is electrically connected to the outer positive plate 46. A center of the positive pole base 44, a center of the middle negative plate 45, and a center of the outer positive plate 46 are arranged with a through hole 441, 451, 461 respectively and correspondingly. Moreover, an end surface of the positive pole base 44 is disposed with an inner and an outer circular grooves 442, 443. Thus a pin 452 of the middle negative plate 45 and a pin 462 of the outer positive plate 46 are respectively mounted in the inner circular groove 442 and the outer circular groove 443 of the positive pole base 44. The positive pole base 44 is connected to the shell 1 so as to fix the positive pole pad 41, the positive pole plastic base 42, and the inner negative plate 43 in the shell 1.

Figure 3:
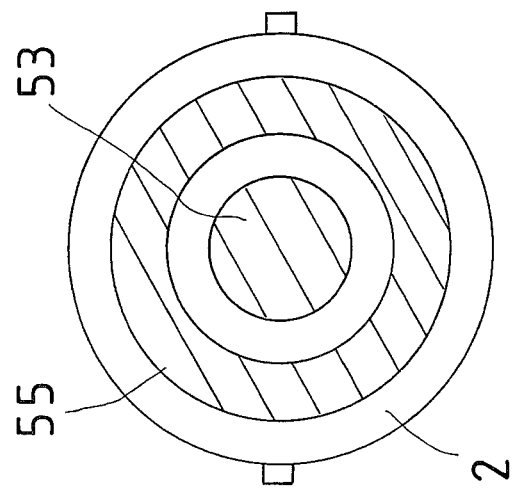
FIG. 3 is a horizontal cross sectional view of a negative pole power distribution unit of an embodiment according to the present invention.
Figure 4:
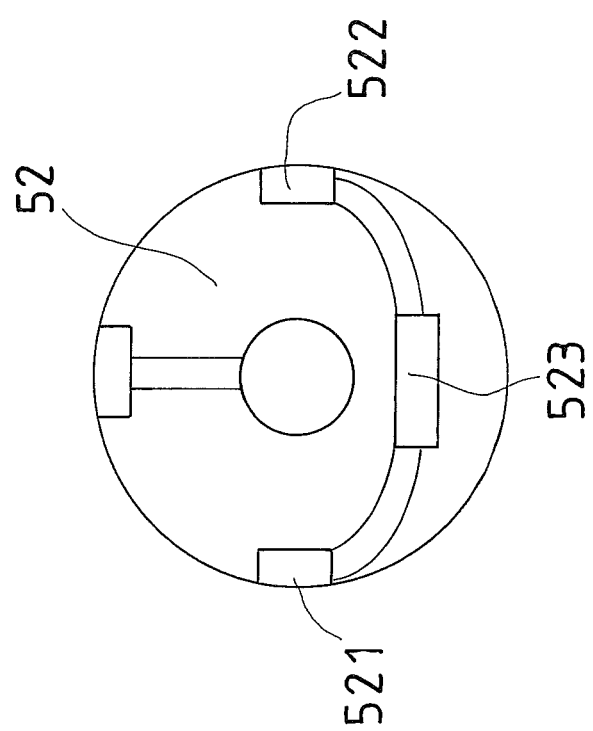
FIG. 4 is a horizontal cross sectional view of a negative protection board of an embodiment according to the present invention.

As to the negative pole power distribution unit 5, as shown in FIG. 3, it is disposed on the negative pole 22 of the electric core 2. From the negative pole 22 of the electric core 2 to an outer side thereof, the negative pole power distribution unit 5 consists of a negative pole pad 51, a negative protection board 52, a positive pole contact 53, a front base 54, and a front negative plate 55 in turn. The negative pole pad 51 is electrically connected to and disposed on the negative pole 22 of the electric core 2. Then the negative pole pad 51 is electrically connected to a negative pole input end 522 of the negative protection board 52. A protection circuit 523 is disposed between the negative pole output end 521 and the negative pole input end 522 of the negative protection board 52 (as shown in FIG. 4) so as to control on/off of the negative pole output end 521 of the negative protection board 52. Moreover, the positive pole contact 53 is attached on the negative protection board 52 and extended out of a central hole 541 of the front base 54. Or the positive pole contact 53 is located in the central hole 541 of the front base 54. The front negative plate 55 is arranged over the front base 54 and is fixed in the shell 1 together with the front base 54, the negative protection board 52 and the negative pad 51. And the front base 54 is leaning against and positioned by the stopper flange 12 on the inner wall of the hollow part 11 of the shell 1.

Figure 5:
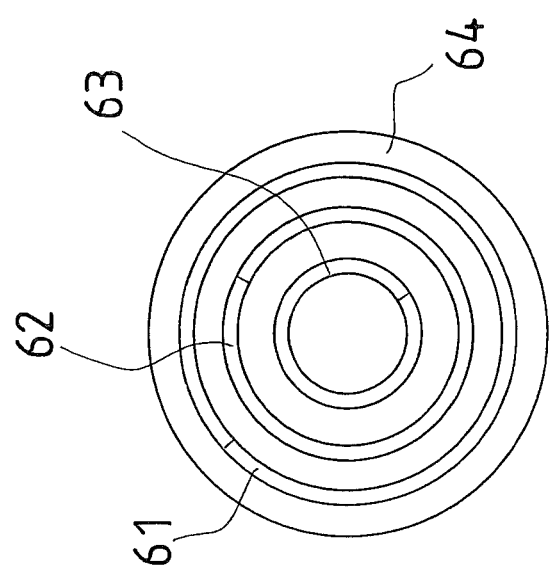
FIG. 5 is a horizontal cross sectional view of a controller of an embodiment according to the present invention.

Refer to FIG. 5, the controller 6 is disposed on the end part of the shell 1 with the positive pole power distribution unit 4. The controller 6 includes an outer positive spring 61, a middle negative spring 62 and an inner negative spring 63 sleeved with each other and respectively electrically contacted with the outer positive plate 46, the middle negative plate 45, and the inner negative plate 43. Moreover, the outer positive spring 61, the middle negative spring 62 and the inner negative spring 63 are assembled on one end of a seat 64 while a circuit board 65 is arranged at the other end of the seat 64. The circuit board 65 is electrically connected to the outer positive spring 61, the middle negative spring 62 and the inner negative spring 63. The seat 64 is further arranged with a signal switch 66 while the signal switch 66 is electrically connected to the circuit board 65. The signal switch 66 is disposed with a single chip so as to be electrically connected to the circuit board 65.

Thereby while in use, refer to FIG. 1, the signal switch 66 of the controller 6 is pressed so as to control the on/off of a circuit between the outer positive plate 46/the middle negative plate 45/the inner negative plate 43 of the positive pole power distribution unit 4 and the conductive sheet group 3 through the circuit board 65 and the connected outer positive spring 61/the middle negative spring 62/the inner negative spring 63. The circuit of the front negative plate 55 of the negative pole power distribution unit 5 electrically connected to the other end of the conductive sheet group 3 is also on. Thus a current is output from the positive pole contact 53 and the front negative plate 55 of the negative pole power distribution unit 5 so as to provide power to appliances. At the same time, the signal switch 66 of the controller 6 can also perform regulation, off and on of the current through the single chip on the circuit board 65.

Moreover, due to the protection circuit 523 arranged at the negative protection board 52, the current from the negative pole output end 521 of the negative protection board 52 is cut off when electrical malfunctions such as short circuit, overload, etc. occur within the electric core 2. The on/off of the inner negative plate 43 is further controlled.

Figure 6:
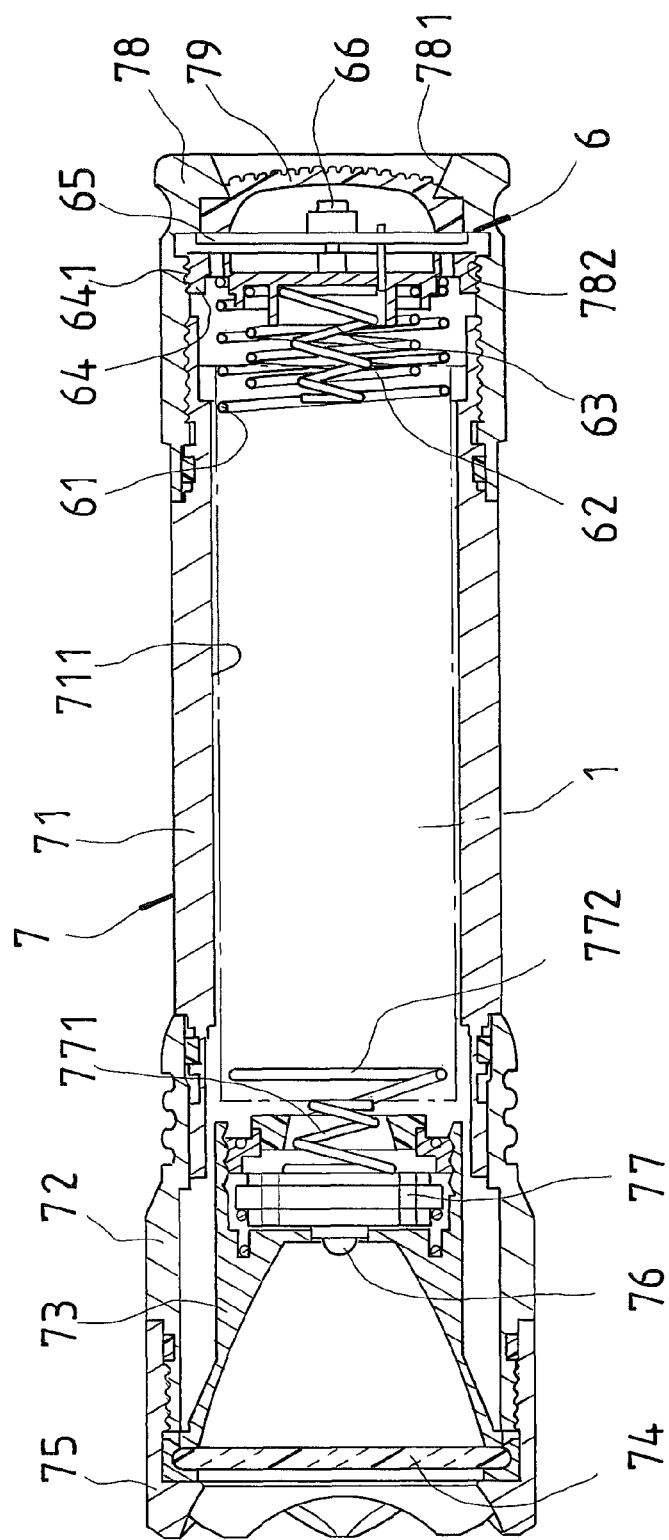
FIG. 6 is a longitudinal cross sectional view of a flashlight and a multipolar cell power supply device of an embodiment according to the present invention.

Furthermore, refer to FIG. 6, a flashlight using the multipolar cell power supply device is revealed. The flashlight 7 includes a tube body 71. A space 711 is formed in the tube body 71 for mounting the multipolar cell power supply device of the present invention. A tube head 72 is threaded with a front end of the tube body 71. A light condenser 73 is disposed on the tube head 72. In front of the light condenser 73, the tube head 72 is arranged with a transparent sheet 74. A front cover 75 is assembled on a front end of the tube head 72 for fixing the assembly of the light condenser 73, and the transparent sheet 74 on the tube head 72. An illuminant 76 is set on a center of the light condenser 73. A conductive base 77 is set on the other end of the tube head 72, corresponding to the end of the tube head 72 with the light condenser 73 and used for electrically connected to the illuminant 76. A positive spring 771 and a negative spring 772 are arranged at the conductive base 77 while the positive spring 771 is located in the negative spring 772. The positive spring 771 and the negative spring 772 are respectively electrically connected to the positive pole contact 53 and the front negative plate 55 of the negative pole power distribution unit 5 of the multipolar cell power supply device in the tube body 71. A back end cover 78 having a hollow-out part 781 on a center thereof is disposed on a rear end of the tube body 71. A waterproof soft cap cover 79 is assembled over the hollow-out part 781 of the back end cover 78 and is corresponding to the signal switch 66 of the controller 6. An outer thread segment 641 disposed around the seat 64 of the controller 6 is threaded with and fixed by an inner thread segment 782 on an inner wall of the back end cover 78. Thereby while in use, the signal switch 66 of the controller 6 is activated by pressing the soft cap cover 79. Thus the inner negative spring 63 and the middle negative spring 62 of the controller 6 are electrically contacted to the inner negative plate 43 and the middle negative plate 45 of the positive pole power distribution unit 4. Through the conductive sheet group 3, the front negative plate 55 and the positive pole contact 53 of the negative pole power distribution unit 5 further output a current for supplying power to the positive spring 771 and the negative spring 772 of the conductive base 77 electrically connected to the positive pole contact 53 and the front negative plate 55 of the negative pole power distribution unit 5. Thus the illuminant 76 arranged at the conductive base 77 is driven to emit light. Then the light emitted from the illuminant 76 is condensed by the light condenser 73 for increasing light intensity and the bright light is projected through the transparent sheet 74. When users intend to stop lighting of the illuminant 76, press the soft cap cover 79 again to activate the signal switch 66 of the controller 6 of the multipolar cell power supply device. Thus the power supply to the illuminant 76 is cut off. According to such structure, there is no need to use the tube body 71 or the conductive sheet as the electrode. The material is saved and the assembly is convenient. Moreover, the controller 6 of the present invention is located at the rear end of the flashlight 7, away from the illuminant 76 disposed on the front end of the flashlight 7. Thus the high temperature heat generated during the operation of the illuminant 76 will not cause damages to the circuit of the controller 6 and the service life of the flashlight 7 is increased significantly.

In summary, the present invention has following advantages:

1. The controller of the multipolar cell power supply device applied to the flashlight is arranged at the rear side of the flashlight and is away from the illuminant disposed on the front end of the flashlight. Thus the high temperature heat generated during the operation of the illuminant will not damage the circuit of the controller. Therefore the service life of the flashlight is improved effectively.

2. The multipolar cell power supply device of the present invention can provide power or cut off the power by itself. And there is no need to use the tube body or the conductive sheet as the electrode. The flashlight is arranged with the control circuit for control of the power supply of the battery. Thus the manufacturing cost of the flashlight is dramatically reduced and the assembly of the flashlight is more convenient and easier. The production efficiency of the flashlight is improved significantly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multipolar cell power supply device comprising a shell, an electric core disposed in a hollow part of the shell, a positive pole power distribution unit and a negative pole power distribution unit arranged on two ends of the shell and respectively corresponding to a positive pole and a negative pole of the electric core, a conductive sheet group mounted in the shell and used for electrically connecting the positive pole power distribution unit to the negative pole power distribution unit, and a controller which is set on one end of the shell with the positive pole power distribution unit and the controller is electrically connected with the positive pole power distribution unit; the positive pole power distribution unit including a positive pole pad, an inner negative plate, a middle negative plate, and an outer positive plate from the positive pole of the electric core to an outer side electrically connected in turn; the negative pole power distribution unit includes a negative pole pad, a negative protection board, a positive contact, and a front negative plate from the negative pole of the electric core to an outer side electrically connected in turn; the conductive sheet group further having a positive pole conductive sheet, a conductive sheet and a negative pole conductive sheet; one end of the positive pole conductive sheet is electrically connected to the positive pole pad of the positive pole power distribution unit while the other end of the positive pole conductive sheet is electrically connected to the positive contact of the negative pole power distribution unit; one end of the conductive sheet is electrically connected to the middle negative plate of the positive pole power distribution unit while the other end of the conductive sheet is electrically connected to the front negative plate of the negative pole power distribution unit; one end of the negative pole conductive sheet is electrically connected to the inner negative plate of the positive pole power distribution unit while the other end of the negative pole conductive sheet is electrically connected to a negative pole output end of the negative protection board of the negative pole power distribution unit; a negative pole input end of the negative protection board is electrically connected to the negative pole pad.

2. The device as claimed in claim 1, wherein the positive pole power distribution unit further includes a positive pole plastic base and a positive pole base; the positive pole plastic base is disposed between the positive pole pad and the inner negative plate while the positive pole base is arranged between the inner negative plate and the middle negative plate; a through hole is mounted in a center of the positive pole base, a center of the middle negative plate, and a center of the outer positive plate respectively and correspondingly; an end surface of the positive pole base is disposed with an inner circular groove and an outer circular groove; a pin formed on the middle negative plate and a pin formed on the outer positive plate are respectively mounted in the inner circular groove and the outer circular groove of the positive pole base; the positive pole base is connected to the shell so as to fix the positive pole pad, the positive pole plastic base, and the inner negative plate in the shell; the negative pole power distribution unit is further disposed with a front base and the front negative plate is disposed on the front base; the front base includes a central hole that allows a positive pole contact to pass through so that the front base, the negative protection board and the negative pole pad are fixed in the shell.

3. The device as claimed in claim 1, wherein the negative protection board is disposed with a protection circuit and the protection circuit is arranged between the negative pole output end and the negative pole input end.

4. The device as claimed in claim 1, wherein the controller includes an outer positive spring, a middle negative spring and an inner negative spring sleeved with each other and respectively electrically contacted with the outer positive plate, the middle negative plate and the inner negative plate; the controller further includes a seat that is disposed with the outer positive spring, the middle negative spring and the inner negative spring; the seat is further arranged with a circuit board and the circuit board is electrically connected to the outer positive spring, the middle negative spring and the inner negative spring; the seat is further set with a signal switch and the signal switch is electrically connected to the circuit board.

5. A flashlight using a multipolar cell power supply device comprising: a flashlight having a tube body with a space, a tube head disposed on a front end of the tube body, an illuminant arranged at a center of the tube head, a conductive base disposed on the tube head and electrically connected to the illuminant, and an back end cover arranged at a rear end of the tube body and with a hollow-out part on a center thereof; a multipolar cell power supply device mounted in the space of the tube body of the flashlight and having a shell, an electric core disposed in a hollow part of the shell, a positive pole power distribution unit and a negative pole power distribution unit arranged on two ends of the shell and respectively corresponding to a positive pole and a negative pole of the electric core, a conductive sheet group arranged in the shell and used for electrically connecting the positive pole power distribution unit to the negative pole power distribution unit; the negative pole power distribution unit is disposed with a positive contact and a front negative plate respectively electrically connected to a positive spring and a negative spring on the conductive base of the flashlight; a seat of a controller is set on one end of the shell with the positive pole power distribution unit; a circuit board is arranged at the seat and is electrically connected with the positive pole power distribution unit; the seat is disposed with a signal switch which is electrically connected to the circuit board and is corresponding to arranged at the hollow-out part of the back end cover of the flashlight; the positive pole power distribution unit including a positive pole pad, an inner negative plate, a middle negative plate and an outer positive plate from the positive pole of the electric core to an outer side electrically connected in turn; the negative pole power distribution unit includes a negative pole pad, and a negative protection board from the negative pole of the electric core to an outer side electrically connected in turn while the negative protection board is disposed with the positive contact and the front negative plate; the conductive sheet group further having a positive pole conductive sheet, a conductive sheet and a negative pole conductive sheet; one end of the positive pole conductive sheet is electrically connected to the positive pole pad of the positive pole power distribution unit while the other end of the positive pole conductive sheet is electrically connected to the positive contact of the negative pole power distribution unit; one end of the conductive sheet is electrically connected to the middle negative plate of the positive pole power distribution unit while the other end of the conductive sheet is electrically connected to the front negative plate of the negative pole power distribution unit; one end of the negative pole conductive sheet is electrically connected to the inner negative plate of the positive pole power distribution unit while the other end of the negative pole conductive sheet is electrically connected to a negative pole output end of the negative protection board of the negative pole power distribution unit; a negative pole input end of the negative protection board is electrically connected to the negative pole pad.

6. The device as claimed in claim 5, wherein the multipolar cell power supply device is further disposed with a soft cap cover that covers the hollow-out part of the back end cover correspondingly.

7. The device as claimed in claim 5, wherein the flashlight further includes a light condenser disposed on the tube head, a transparent sheet arranged at the tube head and located in front of the light condenser, the illuminant arranged at a center of the light condenser, and a front cover assembled on a front end of the tube head for fixing the light condenser and the transparent sheet.

8. The device as claimed in claim 5, wherein the controller includes an outer positive spring, a middle negative spring and an inner negative spring sleeved with each other and respectively electrically contacted with the outer positive plate, the middle negative plate and the inner negative plate; the outer positive plate, the middle negative plate and the inner negative plate are disposed on the seat for electrically connected to the circuit board; the circuit board is further disposed with a single chip.

* * * * *